United States Patent [19]

Evans

[11] Patent Number: 5,738,499
[45] Date of Patent: Apr. 14, 1998

[54] AUTOMOTIVE FLUID EXTRACTION AND DELIVERY DEVICE

[76] Inventor: Gary W. Evans, 147 Crocus La., Jackson, Mo. 63755

[21] Appl. No.: 791,452

[22] Filed: Jan. 27, 1997

[51] Int. Cl.⁶ .................................................. F04F 3/00
[52] U.S. Cl. ........................................ 417/148; 222/400.7
[58] Field of Search .................................. 417/148, 144; 222/400.7

[56] References Cited

U.S. PATENT DOCUMENTS

| | | | |
|---|---|---|---|
| 1,065,233 | 6/1913 | Gittinger | 222/400.7 |
| 1,244,686 | 10/1917 | Bamford et al. | 417/148 U X |
| 1,815,221 | 7/1931 | Sweetland . | |
| 1,886,818 | 11/1932 | Kipp | 417/149 X |
| 2,105,761 | 1/1938 | Wood . | |
| 2,125,624 | 8/1938 | Davis et al. . | |
| 2,153,878 | 4/1939 | Wood . | |
| 2,206,992 | 7/1940 | Wood . | |
| 2,236,834 | 4/1941 | Pickens . | |
| 2,310,714 | 2/1943 | Slaughter | 222/400.7 |
| 2,536,492 | 1/1951 | Dunn et al. . | |
| 2,609,890 | 9/1952 | Millar . | |
| 3,602,607 | 8/1971 | Hodges | 417/148 |
| 3,774,820 | 11/1973 | Zucconi | 222/400.7 |
| 4,082,206 | 4/1978 | Patzke et al. | 417/400.7 |
| 4,119,117 | 10/1978 | Winkelvoss . | |
| 4,964,373 | 10/1990 | Bedi . | |
| 5,002,154 | 3/1991 | Chen . | |
| 5,056,621 | 10/1991 | Trevino . | |
| 5,242,273 | 9/1993 | Payne | 417/148 X |
| 5,405,247 | 4/1995 | Goodman . | |
| 5,415,247 | 5/1995 | Knorr . | |
| 5,427,202 | 6/1995 | Behring et al. . | |

*Primary Examiner*—Charles G. Freay
*Attorney, Agent, or Firm*—Paul M. Denk

[57] ABSTRACT

A fluid delivery/extracting device is provided for extracting fluid from and delivering fluid to a reservoir of a vehicle. The device includes a cylidrical body formed from a tube, a bottom member and a top member. The top member comprises an annular member and a closure which closes the annular member. A pair of fittings extending through the closure, one of which has a portion extending below the closures top surface. A dip tube is applied to the this fitting and extends nearly to the bottom of the container. A first hose extends from the first fitting outer portion to a reservoir to be filled or emptied and is sufficiently long to extend to the bottom of the reservoir. A second hose extends from the second fitting and is connectable to any vacuum port of a vehicle if the device is to be used to empty the reservoir, or to a supply of pressurized air, if the device is to be used to fill the reservoir. The device makes it fairly simple to extract fluid from and deliver fluid to even hard to reach reservoirs, and reservoirs which are filled with highly viscous fluids.

4 Claims, 3 Drawing Sheets

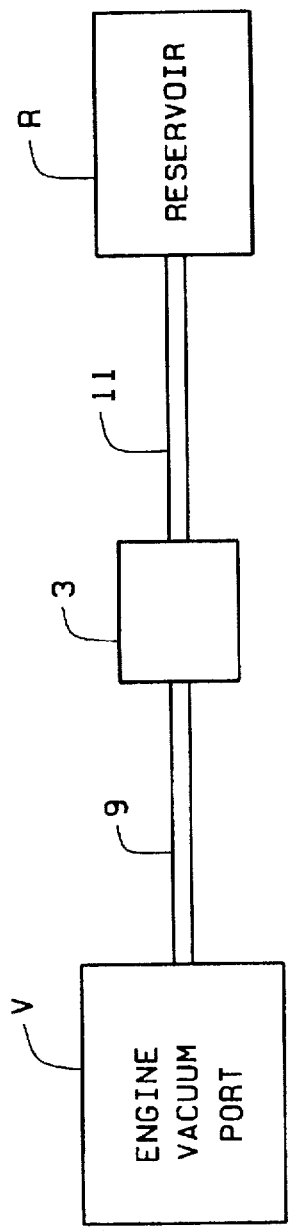
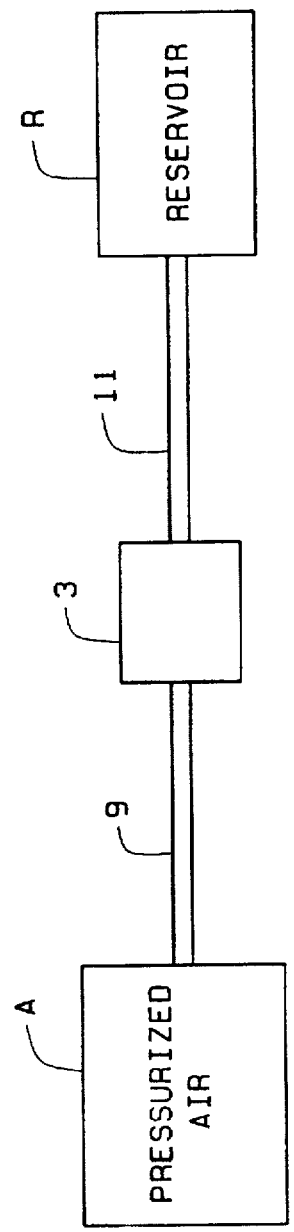

AUTOMOTIVE FLUID EXTRACTION AND DELIVERY DEVICE

BACKGROUND OF THE INVENTION

This invention relates to devices for the service of automobiles, and in particular, to a fluid extraction and delivery device useful for delivering fluids to, and extracting fluids from, hard-to-reach reservoirs in an automobile.

Fluid extracting and delivering devices for extracting and delivering fluid to various reservoirs of a vehicle are known. However, those that are presently available, such as equipment used to flush cooler lines, are very expensive. Such systems are equipped with electric motors, pumps and filters, and it is not economical or practical for a do-it-yourselfer or even a small garage to invest in such equipment.

Further, some of the fluids, such as lubricants for differentials, are very viscous. To refill the deferentials and transmissions of some vehicles requires the use of ½" hose which is two to three feet long with a funnel on one end. Pouring viscous fluids, such as 90 weight gear lubricant or oil additives, such as S.T.P. Oil treatment through such hose is an extremely slow process. Such lubricants and oil additives are available in squeeze tubes. However, it is often very difficult to reach the fill point with such squeeze tubes.

BRIEF SUMMARY OF THE INVENTION

The claims set forth below incorporate one or more of the objectives of the invention.

An object of the invention is to provide a device which can be used to easily extract fluid from, or deliver fluid to, a reservoir of a motor vehicle.

Another object is to provide such a device which may be used with highly viscous fluids, such as gear lubricants.

Another object is to provide such a device which relies on a motor engine for operation, and thus may be used in most any location.

These and other objects will become apparent to those skilled in the art in light of the following disclosure and accompanying drawings.

In accordance with the invention, generally stated, a device is provided for extracting fluid from and delivering fluid to a reservoir of a vehicle. The device includes a cylidrical body formed from a tube, a bottom member and a top member. The bottom member includes a base and upwardly extending side walls which define a upwardly opening chamber sized to snuggly receive the body. The top member comprises an annular member and a closure which closes said annular member. The annular member and closure cooperate to define a downwardly opening chamber which receives the body. The annular member has a lower portion sized to receive the body and an upper portion sized to receive the closure. The closure has a surface sized to fit over said tube and includes a first fitting extending through the surface to have an outer portion which extends above the surface and an inner portion which extends below the surface, and a second fitting which extends above the surface. The body, top member and bottom member cooperate to define a sealed chamber when assembled. A dip tube extends from the first fitting inner portion and extends substantially to the bottom of the sealed chamber. A first hose extends from the first fitting outer portion to a reservoir to be filled or emptied and is sufficiently long to extend to the bottom of the reservoir. A second hose extends from the second fitting.

If the device is to be used to extract the fluid from the reservoir, the second hose is connected to a vacuum port of the engine being worked on. When the engine is operated, a vacuum will be formed in the container which will draw the fluid from the reservoir. If the device is to be used to fill the reservoir, the container is initially filled with the liquid to be supplied to the reservoir, the second hose is connected to a supply of pressurized air, and the first hose is inserted in the reservoir. When the air supply is actuated, the container will be pressurized, and the fluid will be forced up the dip tube, through the first hose, and into the reservoir to be filled. The container can be pressurized sufficiently to force even highly viscous material, such as 90 weight gear lubricant or oil treatments through the first hose to the reservoir. Because the tube can be inserted in hard to reach reservoirs, the device can be used to easily fill or empty hard to reach reservoirs.

BRIEF DESCRIPTION OF THE SEVERAL VIEWS OF THE DRAWINGS

FIG. 3 is a block diagram of the device for use in extracting fluid from a reservoir; and FIG. 4 is a block diagram of the device for use in filling a reservoir with fluid.

Corresponding reference numerals will be used throughout the several figures of the drawings.

DETAILED DESCRIPTION OF THE INVENTION

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention.

Figure 1:
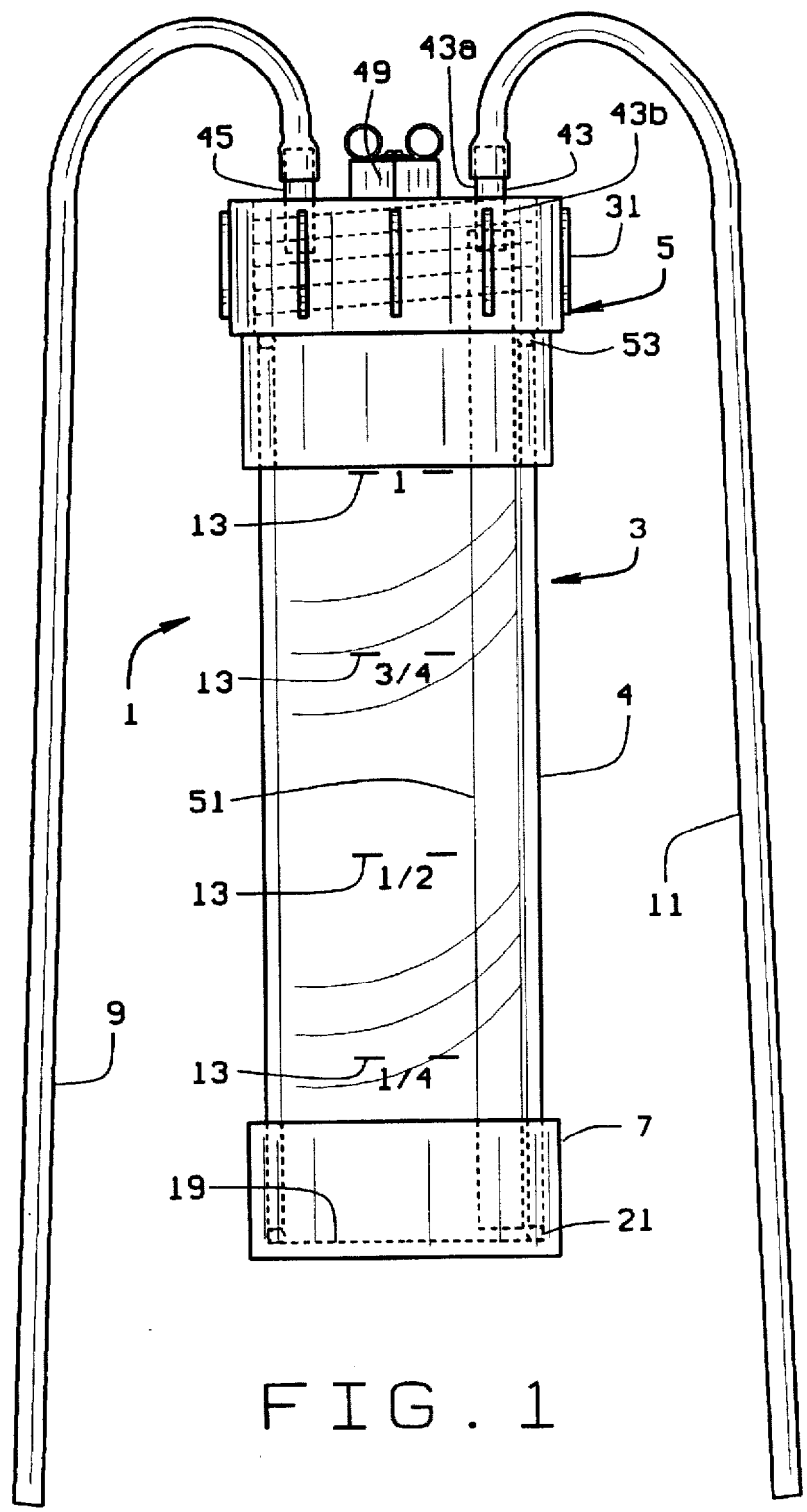
FIG. 1 is a front elevational view of a fluid extractor/delivery device of the present invention.
Figure 2:
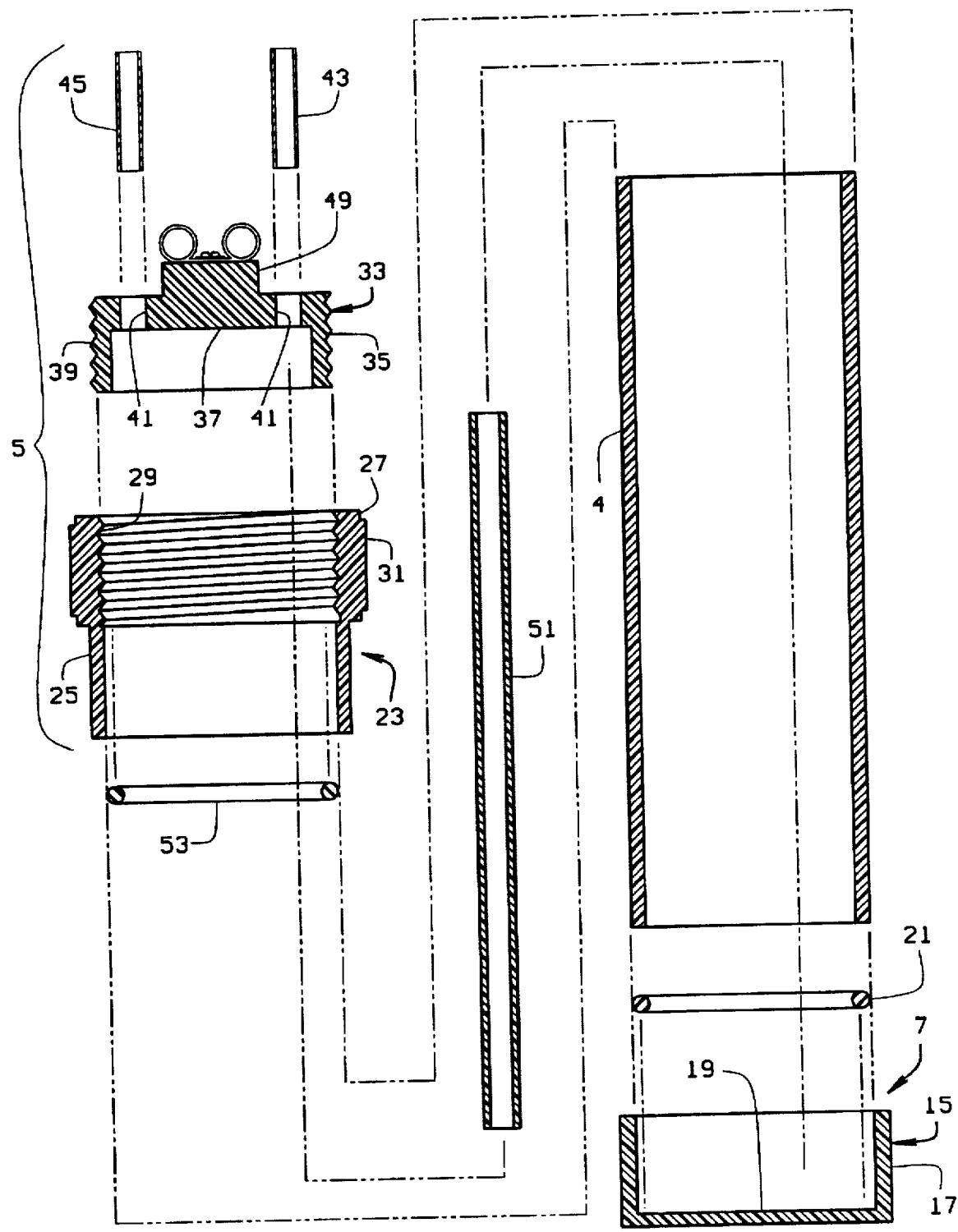
FIG. 2 is an exploded cross-sectional view of the device.

A fluid extractor/delivery device 1 of the present invention is shown generally in FIGS. 1 and 2. The device 1 includes a sealed container 3 comprising a body 4 having a top member 5 and a bottom member 7 defining a chamber. The container body 4 is preferably made from an open ended clear cylinder and is sized to hold at least a quart of liquid. Makings 13 are preferably provided on the cylinder so that the user can visually determine the amount of liquid in the container 3.

The bottom member 7 comprises a cylinder 15 having a side wall 17 and a floor 19. The cylinder 15 is sized to snugly receive the bottom of the body 4. Preferably, an O-ring 21 is positioned on the floor 19 of the bottom cylinder 15. The O-ring 21 preferably has a diameter equal to the diameter of the container body 4 such that the bottom edge of the container 4 will be in contact with the O-ring 21. The O-ring 21 will create a fluid tight seal between the body 4 and the bottom member 7.

The top member 5 comprises an annular open ended cylinder 23 having a bottom portion 25 and a top portion 27. The bottom portion 25 has an inner diameter sized to snugly fit around the top of the container body 4. The top portion 27 has an inner diameter greater than the inner diameter of the bottom portion 25. It is internally threaded, as at 29, and has a plurality of axially extending ribs 31 which can be used to facilitate gripping of the top member 5 to facilitate inserting the top member 7 in the body 4 and removing the top member therefrom.

The top member 5 also comprises a cap 33 which closes the cylinder 23. The cap 33 includes a wall 35 and a roof 37. The wall 35 is externally threaded, as at 39, so that the cap 33 may be screwed into the top cylinder 23. Two ports 41 extend through the roof 37. A first fitting 43 is inserted in one of the ports 41 so that a portion 43a of the fitting extends above the cap roof 37 and a portion 43b extends below the cap roof 37. A second fitting 45 is press fit in the other port 41 so that it extends above the roof 37. Lastly, a nut 49 is fixed to the top of the roof 35 in an accessible spot so that it can be used to screw the cap 33 into the top member cylinder 23.

A dip tube 51 is press fit on the inner portion 43b of fitting 43. The dip tube 51 is sized to extend substantially to the floor 19 of the bottom member 7 when the container 3 is assembled.

A second O-ring 53, equal in size to the first O-ring 21, is placed in the top member 5 against the bottom edge of the cap wall 35. The top edge of the container body 4 will compress the O-ring 53 when the container 3 is assembled, to create an air and fluid tight seal between the container body 4 and the top member 5.

The use of the device 1 is shown diagramatically in FIGS. 3 and 4. When the device 1 is used to extract fluid from a reservoir R (FIG. 3), the hose 11 is inserted into the reservoir R. The hose 11 is of a length sufficient to reach the bottom of the reservoir, so that substantially all the fluid in the reservoir can be extracted therefrom. The other hose 9 is connected to a vacuum port V of the vehicle's engine. The hose 11 can be connected to the PCV valve, an air intake, or carburetor, or any of the other number of vacuum lines generally associated with an internal combustion engine of an automobile, tractor, or the like. By operating the engine, in the usual manner, the vacuum generated at the selected vacuum port of the engine will draw a vacuum in the container 3. This will serve to draw or suck the fluid from the reservoir R into the container 3. Although either of the hoses 9 or 11 could be placed in the reservoir R, to prevent the fluid from the reservoir from being drawn into the vacuum port of the engine, the hose 11, which is connected to the dip tube 51 by the fitting 43 is preferably placed in the reservoir R.

Operating the device 1 in this manner, most fluids can be extracted from the vehicle in which the running engine is situated. These fluids include, for example, power steering fluid, antifreeze, break fluid, rear end fluid, and the like. The only fluid which cannot be extracted from the engine being operated is the engine oil of that engine. A second engine will be needed to remove the oil from a first engine. Otherwise the user runs the risk of operating the engine without oil.

To fill the reservoir R with fluid, the hose 11 is inserted into the reservoir and the hose 9 is connected to a source A of pressurized air, such as a pump or tank of air. When the source A of air is activated, it will pressurize the container 3, which was previously filled with fluid. The fluid will then be forced up the dip tube 51, through the fitting 43 and hose 11 to the reservoir. Because the container 3 can be placed under high pressure (i.e., up to 75 psi or more), high density or highly viscous fluids, such as 90 weight lubricants and high density oil treatments, can be forced through the tube 51 and hose 11 fairly quickly. It will also allow for the fluids such as oil, which become highly viscous when cold, to be easlily transferred to and from the reservoir R. Because it is much easier to thread the hose 11 through the engine case to the desired reservoir, the device 1 greatly simplifies the filling of the reservoir with the appropriate fluid.

As can be appreciated, the device 1, which can be produced inexpensively, greatly facilitates the emptying and filling of the various fluid reservoirs associated with an internal combustion engine. Further, with respect to emptying the reservoir, no source of power, other than the engine, is needed to operate the device 1. It will also be appreciated that the device 1 can be mounted to a wall in any convenient matter. This will make the device readily available. All that is necessary is that the hoses 9 and 11 be sufficiently long to reach from the mounted device to the motor being worked on.

In view of the above, it will be seen that the several objects and advantages of the present invention have been achieved and other advantageous results have been obtained. As various changes could be made in the above constructions without departing from the scope of the invention, it is intended that all matter contained in the above description or shown in the accompanying drawings shall be interpreted as illustrative and not in a limiting sense.

I claim:

1. In combination with an automobile having an internal combustion engine, a vacuum port in the engine, and a reservoir of fluids; a fluid extractor for removing fluid from said reservoir; said fluid extractor including:

a sealed container having a bottom, sides, and top defining a chamber; said top having a first port and a second port therein; a dip tube extending from said first port into said container, said tube extending substantially to the bottom of said first chamber; a first flexible hose extending from said first port externally of said container, said first hose being sufficiently long to extend substantially to the bottom of said reservoir of fluid to place said reservoir in fluid communication with said chamber; and a second hose extending externally from said second port, said second hose being operably connected to said vacuum to place said vacuum in fluid communication with said chamber, said first hose being in fluid communication with said dip tube;

said container comprises a body, a bottom member, and a top member;

said bottom member comprising a base and upwardly extending side walls which define an upwardly opening space sized to receive said body;

said top member comprising an annular member and a cap which closes said annular member;

said annular member having a lower portion sized to receive said tube and an upper portion sized to receive said cap; said cap having a surface sized to fit over said tube, a first fitting extending through said surface to have a portion which extends above said surface and a portion which extends below said surface, and a second fitting which extends above said surface; said first and second ports comprising said first and second fittings, respectfully, said dip tube being connected to said lower portion of said first fitting;

whereby operation of said engine will create a vacuum at said vacuum port, said vacuum port inducing a vacuum in said container chamber which will draw fluid from said reservoir while said engine is being operated.

2. The combination of claim 1 wherein said container has indicia thereon, said indicia indicating volumes in said container.

3. A fluid filling device for filling a fluid reservoir of a vehicle having an internal combustion engine; said filling device comprising:

a body;

a bottom member comprising a base and upwardly extending side walls which define a upwardly opening chamber sized to receive said body;

a top member comprising an annular member and a closure which closes said annular member, said annular member and closure cooperating to define a downwardly opening chamber which received said body;

said body formed as a tube;

said annular member having a lower portion sized to receive said tube and an upper portion sized to receive said closure;

said closure having a surface sized to fit over said tube and including a first fitting extending through said surface to have an outer portion which extends above said surface and an inner portion which extends below said surface, and a second fitting which extends above said surface;

said tube, top member and bottom member defining a sealed chamber when assembled, said chamber being capable of receiving a high viscosity fluid;

a dip tube which extends from said first fitting inner portion, said dip tube extending substantially to the bottom of sealed chamber;

a first hose extending from said first fitting outer portion to said reservoir and being sufficiently long to extend at least part way into said reservoir, said first hose placing said sealed chamber in fluid communication with said reservoir, and a second hose connected at one end to said second fitting, and at another end to a source of pressurized air to place said source of pressurized air in fluid communications with said sealed chamber;

whereby, operation of said source of pressurized air pressurizes said sealed chamber to force said fluid to said reservoir to fill said reservoir with said fluid.

4. The fluid filling device of claim 3, wherein said fluid is highly viscous.

* * * * *